Sept. 28, 1965  R. J. KETTERER ETAL  3,209,196
INORGANIC BONDED RECONSTITUTED MICACEOUS PRODUCTS
Filed March 22, 1960
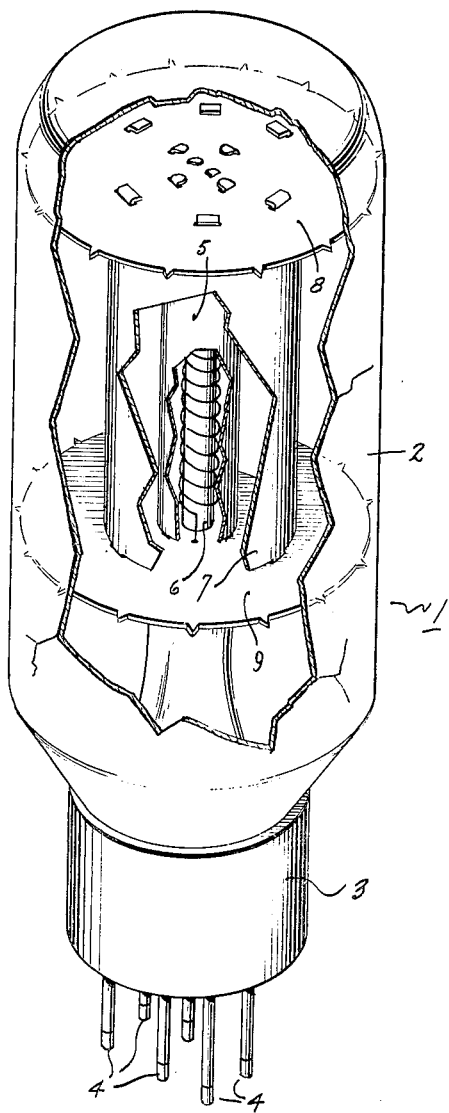
Inventors
Richard J. Ketterer
Robert W. Hursh
by
Their Attorney United States Patent Office 3,209,196
Patented Sept. 28, 1965

3,209,196
INORGANIC BONDED RECONSTITUTED
MICACEOUS PRODUCTS
Richard J. Ketterer and Robert W. Hursh, Burnt Hills, N.Y., assignors to General Electric Company, a corporation of New York
Filed Mar. 22, 1960, Ser. No. 16,882
13 Claims. (Cl. 313—268)

This invention relates to products made from reconstituted micaceous material hereinafter referred to as mica mat bonded with inorganic binders. More particularly, it relates to electronic tube spacers and other useful structures made from such inorganic bonded mica mat. While the invention is described with particular reference to tube spacers, the materials described herein are useful for any of a number of purposes where high temperature resistant material of the type described is indicated.

Heretofore, structural insulators and spacers in electronic tubes which serve to hold the components of the tube in spaced relation with respect to one another and to the tube envelope have been punched from sheets of block mica which tend to be of irregular shape, thickness and variable quality. Generally speaking, the thickness tolerances for such unbonded mica flake spacers range from about 6 to 12 mils. Because of the fact that the mica sheets as received are of irregular area, efficient use of the mica sheets is precluded and the punching of said insulators is largely a hand controlled process.

From the above, it will be quite apparent that there is a definite need for electronic tube insulating spacers which are uniform in nature, will permit better quality control, closer design tolerances and more economical manufacturing which stems from consistent geometry of the micaceous sheets and the ensuing possibility of automatic control. It will also be apparent that there is a need for an improved material for such purpose which will have a smaller percentage of rejects and which will not have the delaminating tendency which is characteristic of mica flake sheets. Additionally, freedom from dependence upon specific sources of mica, particularly in a national emergency, would be most desirable.

An object of this invention is to provide an inorganic bonded mica mat which is useful in general for applications where a high temperature resistant material of desirable electrical and physical characteristics is indicated, such as in tubes, insulators, spacers, and the like.

Briefly stated, the present invention relates to inorganic bonded mica mat having as a binder an ammonium containing material in which the final bonding material is composed of borates and phosphates such that the $B_2O_3$ to $B_2O_3+P_2O_5$ mole percent ratio ranges from about 10% to 90% preferably from about 10% to 70% and most preferably where this ratio is 64 mole percent, said material being processed as hereinafter described.

Those features of the invention which are believed to be novel are set forth in the claims appended hereto. The invention will, however, be better understood and further advantages and purposes thereof obtained from a consideration of the following description and the drawing in which the single figure is a partially cutaway view of an electronic tube utilizing the present materials as a tube spacer.

The mica mat which has been found to be useful in connection with this invention may be prepared, for example, according to the teachings of Bardet Patent 2,549,880. Generally speaking, the natural or synthetic mica or other equivalent starting material is heated to a temperature sufficient for producing cleavage and then comminuted by various methods to a finely divided state and is then reconstituted in the form of a mat or sheet by well known paper making methods.

The preferred binder system for the mica mat consists of a water solution containing ammonium diborate and ammonium dihydrogen phosphate. Other closely related materials such as diammonium hydrogen phosphate, ammonium metaphosphate, or even ammonium hydroxide and phosphoric acid may be used in such amounts to get a desired ammonium, borate and phosphate containing material. Among such materials which are useful is boric acid which may be used in place of the diborate with the ammonium hydroxide and phosphoric acid to produce an analogous binder material. It has been found that the use of ammonium salts in connection with the present invention is advantageous from a number of viewpoints. It has been found first of all that the use of the ammonium compounds produces a stronger product. It has also been found that the ammonium compounds produce not a glassy material such as is often found with binder materials of this general type but a crystalline structure which is eminently more superior from an insulating point of view than the glass-like materials. Another particular advantage of the crystalline structure as opposed to a vitreous structure is the fact that the flake-like characteristic of the mica mat is preserved so that when it is used in such applications such as for a tube spacer where it is in contact with a glass or metal envelope, the flakes tend to spread to a degree which provides a firm grip on the envelope. The use of ammonium compounds also eliminates the possibility that metallic ions or constituents might remain in the binder as is the case with metallic salts.

Generally speaking, the procedure for making the present materials includes first, the impregnation of the raw mica mat sheets in various thicknesses as desired or in the form of laminae with the binder system and drying, after which the sheets are pressed either singly or in the form of a laminated board and baked in an open furnace.

The water impregnating solution contains ammonium diborate and ammonium dihydrogen phosphate or equivalent material in such ratios that the $B_2O_3$ to $B_2O_3+P_2O_5$ mole percent ratio is from about 10% to 90%. It is preferably applied to the mica mat by carrying the raw mica mat on a wire screen or other permeable carrier over a roll coater which latter picks up the binder solution and transfers it to the carrier wire and the mica mat. Other methods of impregnating the mica mat may be used such as spraying or even impregnating the mica slurry but the above method is preferred particularly in view of the fact that the carrier serves as a support for the mica mat which in its raw, unimpregnated and uncured state lacks physical strength. The present method also permits the homogeneous impregnation of the mica mat with large quantities of the binder solution thus permitting the use of materials which have a rather limited solubility in water or a high viscosity. Other binder materials which give an equivalent final composition may be used as pointed out above. Amounts of ammonium greater than about that necessary to produce a neutral binder impregnating solution have been found to increase the amount of ammonia given off during the baking process and tend to produce a board which blisters. Enough ammonium radical to produce a pH 5 solution is also indicated. The working range of the borate to phosphate ratio expressed as mole percent $B_2O_3$ to $B_2O_3+P_2O_5$ as pointed out above ranges from about 10% to 90%, preferably from 10% to 70% and most preferably 64%. Mole percent ratios of the above materials above 90% produce a product which will not bake out to an insoluble state and below about 10%, one which is prone to blistering. There are, of course, variations in the properties of the material as the ratio is increased within the above limits. For example, between 10% and 20%, the moisture absorption of the finished product is at a minimum whereas above 20% it increases. The above-mentioned 64 mole percent preferred composition is arrived at by balancing various factors including susceptibility to blistering during processing, ease of binder solution, and so forth, although it will be realized that other compositions are very useful.

The total amount of binder present in the impregnated material should range between about 3% and 10%, by weight, of the raw mica mat as measured after pressing but before baking. Less than about 3% binder produces a material which is lacking in strength. Amounts greater than about 10% dry very slowly during the drying stage and during the preconditioning prior to baking and are prone to blistering in the baking stage.

After the mica mat is impregnated, it is exposed temporarily to temperatures which may range as high as 275° F. which should, however, be reduced to not exceeding 210° F. as dryness is approached to prevent blistering. The drying is carried out to the point where less than about 1% of moisture is present in the mica mat which is retained on the carrier during the drying process. Such drying is necessary in order to permit removal of the mat from the carrier without tearing.

It is necessary before pressing the material to remoisten it to a moisture weight content of from about 1% to 10% water and preferably 4% to facilitate pressing and to prevent blistering during the baking process. The amount of remoistening within the above range will depend on binder content, pressure, the thickness of the mat, and the rate of heating during prebaking, conditioning, and the baking cycle. Permissible moisture may in some cases range as high as 10%, but generally speaking, for a spacer board 0.012″ thick from 3 to 5% of moisture prior to pressing is preferred.

The preferred pressing temperature is 400° F. but may range as low as 300° F. and to much higher temperatures if equipment for such elevated temperatures is available. The preferred pressing pressure is 500 lbs. per sq. inch, although good results have been obtained with the lower moisture contents with pressures as low as 125 lbs. per sq. inch. Pressures up to about 4,000 lbs. per sq. inch have been used in producing a desirable material. The time of pressing depends upon the temperature and pressure. Generally speaking, such times can be determined for any particular size sheet by routine experimentation. For example, at 500 lbs. per sq. inch and 400° F. using a board such that the maximum distance from any point to the edge of the board is 6 inches, the pressing time is about 2 hours.

After pressing the board or mat may be preconditioned to remove any blister-producing residual traces of water by exposing the boards to a gradual rise in temperature from about 220° F. to 340° F. over a period of from about 6 to 8 hours. To the extent that the preconditioning process may be combined with the succeeding baking process this step may be omitted.

At the time the material is preconditioned and ready for baking it is still susceptible to disintegration in water, but by further raising the temperature in the baking step in an open oven to a critical value which is determined by the choice of the binder system, an unexpected conversion to an insoluble board takes place. For the present ammonium-borate-phosphate combinations, this occurs at temperatures ranging from about 950° F. to 1050° F. for periods varying between 10 minutes and 2 hours. For example, a board 0.012″ thick requires about 2 hours to come up to temperature. After reaching the baking temperature the board is held at that constant temperature for about 1 hour. It will be realized that the baking cycle is of a time-temperature nature. For example, at about 1000° F., a minimum of about 1 hour is required to convert the board to an insoluble non-disintegrating state. On the other hand, at about 1050° F. only one-quarter hour is needed and at 950° F. at least 2 hours are needed. The boards produced by the process, once they are insolubilized can, for example, be soaked for 2 hours in water, redried gently and they will exhibit all of their original strength.

The following example will illustrate the practice of the invention, it being understood that the specific example is not to be taken as limiting in any way. Mica mat sheet 0.004″ thick in the raw state was impregnated with a solution in the manner described containing by weight 1% ammonium biborate tetrahydrate and 1% ammonium dihydrogen phosphate. This solution gives a $B_2O_3$ to $B_2O_3+P_2O_5$ mole percent ratio as pointed out above of 64 mole percent. The binder content of the material when impregnated ranged from about 5 to 6%. The mat was dried at a temperature of about 200° F. to a moisture content of 0.5% by weight, this process taking about one-quarter hour. Four plies of the 0.004″ mat were laid up and the material was then remoistened as described to a moisture content to about 3% and pressed at a temperature of 400° F. and 500 p.s.i. for 3 hours. Before baking, the material was gradually heated over a period of 8 hours to a temperature of 340° F. to precondition it for baking which baking was carried out at a temperature of 1050° F. for 1 hour, the time to temperature being 2 hours. The average thickness of material so prepared is about 0.0123 inch.

The resultant material was not dispersible in water even after total immersion for several hours. The rate of cooling after baking does not appear to be critical. The material after baking had a flexural strength of 30,000 p.s.i. and a flexural modulus of $10 \times 10^6$. Its strength recovery was 100% even after a two-hour immersion in water and redrying at 90° C. Its density was 2.0, and its water absorption 7%.

The electrical characteristics of the material so produced are very desirable. For example, its arc resistance at 23° C. is over 420 seconds and its dielectric strength at a like temperature is 2,000 volts per mil. The 60 cycle dielectric constant is 3.5 at 200° C., 5.0 at 350° C., and 11.6 at 500° C. The room temperature dielectric constant is 4.4 at 60 cycles, 3.4 at 1 kilocycle and 3.2 at 10 and 100 kilocycles and at 1 megacycle.

The 60 cycle power factor of the material is likewise quite desirable being 2.8% at 200° C., 26.5% at 350° C. and 58.3% at 500° C. At room temperature the power factor is 18.1% at 60 cycles, 7.4% at 1 kilocycle, 2.1% at 10 kilocycles, 0.71% at 100 kilocycles and 0.42% at 1 megacycle.

The volume resistivity of the material at 23° C. is $3.3 \times 10^{13}$ ohm-cm.; at 200° C. it is $2.0 \times 10^{13}$ ohm-cm. ranging downwardly to $1.8 \times 10^9$ ohm-cm. at 500° C. The insulation resistance of the material at 23° C. is $6.8 \times 10^{10}$ ohms and at 500° C. it is $5.6 \times 10^8$ ohms. The insulation resistance at 300° C. after exposure to 500° C. is $7.4 \times 10^{10}$ ohms and at 100° C. after exposure to 500° C. it is $3 \times 10^{14}$ ohms.

The present materials are resistant to disintegration under high temperature conditions. For example, the material was exposed to a water stabilized arc with the triangular heat flux starting at 750 B.t.u. per foot square second and dropping to 150 B.t.u. per foot square second in 15 seconds with the rate of retraction at 0.1″ per second and 33 kw. of power to the electrodes. The weight of a one inch diameter sample weighed before the above arcing test was 6.669 grams whereas after exposure to the arc it was 5.640 grams for a total weight loss of 1.029 grams. This compares favorably with weight losses for other materials under exactly the same conditions. For example, under such conditions a polytetrafluoroethylene sample lost 3.999 grams, a polyurethane resin lost 1.87 grams and sintered fuse quartz lost 0.68 gram.

The flexural strength retention of the present materials is also very salutary. For example, when samples were exposed for the times shown in Table I below to a temperature of 1300° F., the strengths tested at 1000° F. and the strengths at room temperature were as shown.

TABLE I

*Flexural strength retention at elevated temperature*

| Time Exposed to 1,300° F. | Strength at 1,000° F., p.s.i. | Strength at Rm. Temperature, p.s.i. |
|---|---|---|
| 6 hours | 26,000 | 26,000 |
| 50 hours | 39,500 | 21,000 |
| 100 hours | 33,000 | 19,000 |
| 200 hours | 28,000 | 18,000 |

From the physical characteristics set forth above, it will at once be realized that the present material will have a myriad of applications wherever a high temperature resistant insulating material is desired. As pointed out above, a noteworthy application of these materials is in electron tube spacers. Among the characteristics which are desirable for tube spacers are the following: (a) it must have an adequate insulating property at operating temperatures, (b) it must not release volatile materials under heat and vacuum to the detriment of tube life, (c) it must have adequate strength, (d) it must provide a means of maintaining the proper positions of the tube elments under various conditions of location, shock and so forth, and (e) it must resist processing conditions during tube manufacture without deteriorating, including possible washing with water and alcohol and have good punchability. The present materials fulfill to a highly desirable degree all of the above characteristics as well as others.

Other bonded mica mat products were prepared in a manner similar to the above example and found to have excellent electrical as well as physical qualities. For example, such bonded materials containing less than about 10 mole percent, $B_2O_3$ to $B_2O_3+P_2O_5$ tended to blister during baking while those over 90 mole percent tended to be chalky. Materials containing 20 mole percent $B_2O_3$ on the above basis had a flexural strength of 34,000 p.s.i.; at 33 mole percent, 34,860 p.s.i.; at 45 mole percent, 33,040 p.s.i.; at 50 mole percent, 35,320 p.s.i. and at 60 mole percent, 29,380 p.s.i. Mica mat boards of up to one-quarter inch and thicker have been made by the present process.

Shown in FIGURE 1 is a simple triode which illustrates the use of the present invention as a tube spacer. Shown in the figure is electronic tube 1 having an envelope 2 and base 3 with contacts 4 leading into the tube envelope in well known manner to the grid 5, cathode 6 and plate 7. It will be noted that tube spacers 8 and 9 shown respectively at the top and bottom of the interior tube elements are punched and provided with projections or points as shown so as to hold the elements in relative position one to the other and also firmly in place with respect to the tube envelope.

The present materials used in lieu of the usual bonded mica flakes as tube spacers not only perform very satisfactorily in the tube but losses of punched parts during fabrication have dropped from 22% using mica flake to about 0.8% using the present materials. The finished tubes using the present materials have been found to be superior to those using mica flake spacers insofar as vibration and shock resistance is concerned. It has also been found that the use of the present materials results in a much longer tube life since the materials deteriorate much less rapidly.

Shown in Table II below are the hours of operation of typical 6BK7A electronic tubes with the corresponding transconductance gm expressed in the micromhos for the present materials and for unbonded mica flake spacers.

TABLE II

| Type 6BK7A Tubes, Hrs. of Operation | Present Material, gm. (μmhos) | Unbonded Mica Flake, gm. (μmhos) |
|---|---|---|
| 0 | 9,902 | 9,485 |
| 504 | 8,916 | 8,309 |
| 1,000 | 8,378 | 7,576 |
| 1,512 | 8,118 | 7,280 |
| 2,016 | 6,820 | 6,613 |
| 2,520 | 6,854 | 6,396 |
| 3,024 | 6,824 | 5,791 |

From the above, it will be quite apparent that the use of the present materials as tube spacers results in a definitely superior tube over a prolonged period of time. It is not known, but believed that the present spacers serve also as getters. The present material has also been found to be a superior protective coating for underlying organic or other laminates. For example, an organic laminate which ordinarily would burn up completely in about 20 hours at a temperature of 780° F. was found to retain over half of its original strength after 20 hours of exposure when covered with a 0.012" layer of the present material.

There are provided, then, by this invention bonded mica mat products and structures which are useful for many purposes. The material is very useful in electrical applications when exposure to arcs is experienced such as in arc chutes. It is also useful as slot liners, slot wedges and commutator retaining rings, cones and wedges and as phase separators and segment plates for electrical machinery. In general the materials are useful in any application where high electrical characteristics are desirable, particularly at elevated temperatures as well as at ordinary temperatures.

What we claim as new and desire to secure by Letters Patent of the United States is:

1. A structure comprising reconstituted micaceous material bonded together with a cured crystalline binder consisting essentially of boron-, phosphorus- and oxygen-containing material in which the mole percent ratio of $B_2O_3$ to $B_2O_3+P_2O_5$ ranges from about 10% to 90%.

2. A structure comprising reconstituted micaceous material bonded together with a cured crystalline binder consisting essentially of boron-, phosphorus- and oxygen-containing material in which the mole percent ratio of $B_2O_3$ to $B_2O_3+P_2O_5$ ranges from about 10% to 70%.

3. A structure comprising reconstituted micaceous material bonded together with a cured crystalline binder consisting essentially of boron-, phosphorus- and oxygen-containing material in which the mole percent ratio of $B_2O_3$ to $B_2O_3+P_2O_5$ ranges from about 10% to 20%.

4. A structure comprising reconstituted micaceous material bonded together with a cured crystalline binder consisting essentially of boron-, phosphorus- and oxygen-containing material in which the mole percent ratio of $B_2O_3$ to $B_2O_3+P_2O_5$ is about 64%.

5. A structure comprising reconstituted micaceous material bonded together with a cured crystalline binder consisting essentially of boron-, phosphorus- and oxygen-containing material in which the mole percent ratio of $B_2O_3$ to $B_2O_3+P_2O_5$ is about 20%.

6. The process of preparing bonded reconstituted micaceous material which comprises impregnating said material with an ammonium compound containing impregnant consisting essentially of boron-, phosphorus- and oxygen-containing material in which the mole percent ratio of $B_2O_3$ to $B_2O_3+P_2O_5$ ranges from about 10 to 90%, drying said material to a water content of less than about 1%, remoistening said material to a water content to from about 1 to 10%, pressing said material at a temperature of at least 300° F. at a pressure of at least 125 lbs. per sq. inch and baking said material at atmospheric pressure at a temperature of from about 950° F. to about 1050° F. for from about two hours to about ten minutes.

7. In an electronic tube containing electronic components mounted therein micaceous spacer means for spacing said electronic components, said spacer means consisting of a bonded reconstituted micaceous material having a crystalline binder consisting essentially of boron-, phosphorus- and oxygen-containing material in which the mole percent ratio of $B_2O_3$ to $B_2O_3+P_2O_5$ ranges from about 10% to 90%.

8. In an electronic tube having electronic components mounted therein, micaceous spacer means for spacing said electronic components, said spacer means consisting of a bonded reconstituted micaceous material having a crystalline binder consisting essentially of boron-, phosphorus- and oxygen-containing material in which the mole percent ratio of $B_2O_3$ to $B_2O_3+P_2O_5$ ranges from about 10% to 70%.

9. In an electronic tube having electronic components mounted therein, micaceous spacer means for spacing said electronic components, said spacer means consisting of a bonded reconstituted micaceous material having a crystalline binder consisting essentially of boron-, phosphorus- and oxygen-containing material in which the mole percent ratio of $B_2O_3$ to $B_2O_3+P_2O_5$ is about 64%.

10. In an electronic tube having electronic components mounted therein, micaceous spacer means for spacing said electronic components, said spacer means consisting of a bonded reconstituted micaceous material having a crystalline binder consisting essentially of boron-, phosphorus- and oxygen-containing material in which the mole percent ratio of $B_2O_3$ to $B_2O_3+P_2O_5$ is about 20%.

11. In an electronic tube having electronic components mounted therein, micaceous spacer means for spacing the electronic components thereof, said spacer means consisting of a bonded reconstituted micaceous material having a crystalline binder consisting essentially of boron-, phosphorus- and oxygen-containing material in which the mole percent ratio of $B_2O_3$ to $B_2O_3+P_2O_5$ is about 10% to 20%.

12. A structure comprising reconstituted micaceous material bonded together with a heat cured crystalline binder produced from a solution containing essentially ammonium biborate and ammonium dihydrogen phosphate in such amounts that the mole percent ratio of $B_2O_3$ to $B_2O_3+P_2O_5$ in said binder ranges from about 10% to 90%.

13. A structure comprising reconstituted micaceous material bonded together with a heat cured crystalline binder produced from a solution containing essentially materials selected from the group consisting of (a) ammonium biborate and ammonium dihydrogen phosphate, and (b) borate-, phosphate-, and ammonium-containing materials in amounts to produce a binder solution having a pH of from about 5 to about 7, the binder being such that the mole percent ratio of $B_2O_3$ to $B_2O_3+P_2O_5$ in said binder ranges from about 10% to 90%.

References Cited by the Examiner

UNITED STATES PATENTS

| 2,196,974 | 4/40 | Boughton et al. | 154—2.6 |
| 2,897,573 | 8/59 | Hessinger | 106—39 X |
| 2,979,108 | 4/61 | Thompson | 154—43 |

EARL M. BERGERT, *Primary Examiner.*

JOSEPH REBOLD, ALEXANDER WYMAN, CARL F. KRAFFT, *Examiners.*